(12) United States Patent
Hirata et al.

(10) Patent No.: US 11,834,731 B2
(45) Date of Patent: Dec. 5, 2023

(54) METHOD OF PRODUCING FERRITIC HEAT-RESISTANT STEEL WELDED JOINT (71) Applicant: NIPPON STEEL CORPORATION, Tokyo (JP)

(72) Inventors: Hiroyuki Hirata, Tokyo (JP); Kana Jotoku, Tokyo (JP); Shinnosuke Kurihara, Tokyo (JP); Katsuki Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 409 days.

(21) Appl. No.: 17/298,678

(22) PCT Filed: Dec. 5, 2019

(86) PCT No.: PCT/JP2019/047717
§ 371 (c)(1),
(2) Date: Jun. 1, 2021

(87) PCT Pub. No.: WO2020/116588
PCT Pub. Date: Jun. 11, 2020

(65) Prior Publication Data
US 2022/0042150 A1 Feb. 10, 2022

(30) Foreign Application Priority Data
Dec. 5, 2018 (JP) .................. 2018-228314

(51) Int. Cl.
| | | |
|---|---|---|
| *C22C 38/54* | (2006.01) | |
| *B23K 35/30* | (2006.01) | |
| *C22C 38/38* | (2006.01) | |
| *C22C 38/00* | (2006.01) | |
| *C22C 38/02* | (2006.01) | |
| *C22C 38/06* | (2006.01) | |
| *C22C 38/20* | (2006.01) | |
| *C22C 38/22* | (2006.01) | |
| *C22C 38/28* | (2006.01) | |
| *C22C 38/30* | (2006.01) | |
| *B23K 103/04* | (2006.01) | |
| *B23K 103/16* | (2006.01) | |

(52) U.S. Cl.
CPC .......... *C22C 38/38* (2013.01); *B23K 35/3086* (2013.01); *C22C 38/001* (2013.01); *C22C 38/02* (2013.01); *C22C 38/06* (2013.01); *C22C 38/20* (2013.01); *C22C 38/22* (2013.01); *C22C 38/28* (2013.01); *C22C 38/30* (2013.01); *B23K 2103/04* (2018.08); *B23K 2103/166* (2018.08); *C21D 2211/005* (2013.01)

(58) Field of Classification Search
CPC .................................................. B23K 35/3053
See application file for complete search history.

(56) References Cited

U.S. PATENT DOCUMENTS

| | | |
|---|---|---|
| 2006/0237103 A1 | 10/2006 | Tabuchi et al. |
| 2010/0086430 A1 | 4/2010 | Hirata et al. |
| 2018/0354059 A1 | 12/2018 | Hirata et al. |

FOREIGN PATENT DOCUMENTS

| | | |
|---|---|---|
| JP | H04-371551 A | 12/1992 |
| JP | H04-371552 A | 12/1992 |
| JP | H08-187592 A | 7/1996 |
| JP | H09-308989 A | 12/1997 |
| JP | H11-320096 A | 11/1999 |
| JP | 2002-241903 A | 8/2002 |
| JP | 2004-300532 A | 10/2004 |
| JP | 2010-007094 A | 1/2010 |
| JP | 2015-206078 A | 11/2015 |
| JP | 2016-130339 A | 7/2016 |
| WO | 2008/149703 A1 | 12/2008 |
| WO | 2017/104815 A1 | 6/2017 |

*Primary Examiner* — Jophy S. Koshy
(74) *Attorney, Agent, or Firm* — SOLARIS Intellectual Property Group, PLLC (57) ABSTRACT

A method of producing a ferritic heat-resistant steel welded joint, the method including: a multi-layer welding step in which a ferritic heat-resistant steel base material including B at 0.006% by mass to 0.023% by mass is multi-layer welded using a Ni-based welding material for heat-resistant alloy, wherein root pass welding is performed under a welding condition such that a ratio of an area $[S_{BM}]$ that has been melted of the ferritic heat-resistant steel base material to an area $[S_{WM}]$ of a weld metal, in a transverse cross-section of a weldment after the root pass welding but before second pass welding in the multi-layer welding step, satisfies the following formula (1): $0.1 \leq [S_{BM}]/[S_{WM}] \leq -50 \times [\% \ B_{BM}] + 1.3$, with respect to a mass percent of B, $[\% \ B_{BM}]$, which is included in the ferritic heat-resistant steel base material.

6 Claims, 2 Drawing Sheets

METHOD OF PRODUCING FERRITIC HEAT-RESISTANT STEEL WELDED JOINT

TECHNICAL FIELD

The present disclosure relates to a method of producing a ferritic heat-resistant steel welded joint.

BACKGROUND ART

In recent years, temperature and pressure of steam conditions have been increased in thermal power generation in order to improve thermal efficiency, and operation under an ultra-supercritical condition of 650° C. and 350 atm in the future has been planned. Ferritic heat-resistant steels have been widely used because they are not only inexpensive compared with austenitic heat-resistant steels or Ni-based heat-resistant steels but also have a small thermal expansion coefficient, which is advantageous as high-temperature steels.

In order to cope with the increasing severity of steam conditions in the future, ferritic heat-resistant steel materials have been proposed which is aimed at achieving an increased strength by, for example, optimizing the contents of W and Mo, and by including Co and B, as disclosed in Patent Document 1 or Patent Document 2. Furthermore, as disclosed in Patent Document 3, various materials aimed at achieving an increased strength by actively utilizing carbides and intermetallic compound phases that precipitate at martensite lath interfaces have been proposed.

Various ferritic heat-resistant steels that are aimed at suppressing a decrease in creep strength at a weld heat-affected zone (hereinafter, also referred to as "HAZ") of a welded joint, which would be a problem in the case of using ferritic heat-resistant steels as welded structures, have been proposed recently. For example, Patent Document 4 discloses a ferritic heat-resistant steel that can suppress the decrease in creep strength at a HAZ by suppressing grain refining at the HAZ by including B at 0.003% to 0.03%. Furthermore, each of Patent Document 5 and Patent Document 6 discloses a ferritic heat-resistant steel that can suppress the decrease in strength of a HAZ and prevent liquation cracking during welding by including a large amount of B and by adjusting the C content depending on a welding heat input or the B content.

These ferritic heat-resistant steels including a large amount of B are generally welded to be used. Therefore, as a welding material used in welding, for example, Patent Document 7 proposes a welding material for ferritic heat-resistant steel, which is designed to achieve both creep strength and toughness by including B at 0.0005% to 0.006% and by adjusting (Mo+W)/(Ni+Co) to a predetermined range. Further, Patent Document 8 proposes a welding material for ferritic heat-resistant steel, which is designed to achieve both creep strength and toughness by optionally including B at 0.0005% to 0.006% and by adjusting a Cr equivalent in addition to (Mo+W)/(Ni+Co) and (0.5×Co+0.5×Mn+Ni). Furthermore, Patent Document 9 discloses a welding material for ferritic heat-resistant steel, which achieves both excellent creep strength and toughness by including B at 0.007% to 0.015% and by adjusting (Cr+6Si+1.5W+11V+5Nb+10B−40C−30N−4Ni−2Co−2Mn) to a predetermined range.

PRIOR ART DOCUMENTS

Patent Documents

Patent Document 1: Japanese Patent Application Laid-Open (JP-A) No. H4-371551
Patent Document 2: Japanese Patent Application Laid-Open (JP-A) No. H4-371552
Patent Document 3: Japanese Patent Application Laid-Open (JP-A) No. 2002-241903
Patent Document 4: Japanese Patent Application Laid-Open (JP-A) No. 2004-300532
Patent Document 5: Japanese Patent Application Laid-Open (JP-A) No. 2010-7094
Patent Document 6: International Publication (WO) No. 2008/149703
Patent Document 7: Japanese Patent Application Laid-Open (JP-A) No. H8-187592
Patent Document 8: Japanese Patent Application Laid-Open (JP-A) No. H9-308989
Patent Document 9: International Publication (WO) No. 2017/104815

SUMMARY OF INVENTION

Technical Problem

In welding of ferritic heat-resistant steels including a large amount of B, Ni-based welding materials for heat-resistant alloys are used in some cases because an excellent creep strength can be stably obtained. However, solidification cracking may occur in weld metals.

The present disclosure is made in consideration of the above circumstances, and an object of the present disclosure is to provide a method of producing a ferritic heat-resistant steel welded joint that is capable of stably suppressing solidification cracking even when a Ni-based welding material for heat-resistant alloy is used in multi-layer welding of a ferritic heat-resistant steel base material including a large amount of B.

Solution to Problem

As a result of studies made in consideration of the above circumstances, the present inventors have found that the above problem can be solved by the following means.

<1> A method of producing a ferritic heat-resistant steel welded joint, the method including:

a multi-layer welding step in which a ferritic heat-resistant steel base material including B at 0.006% by mass to 0.023% by mass is multi-layer welded using a Ni-based welding material for heat-resistant alloy, in which root pass welding is performed under a welding condition such that a ratio of an area $[S_{BM}]$ that has been melted of the ferritic heat-resistant steel base material to an area $[S_{WM}]$ of a weld metal, in a transverse cross-section of a weldment after the root pass welding but before second pass welding in the multi-layer welding step, satisfies the following formula (1), with respect to a mass percent of B, $[\% B_{BM}]$, which is included in the ferritic heat-resistant steel base material:

$$0.1 \leq [S_{BM}]/[S_{WM}] \leq -50 \times [\% B_{BM}] + 1.3 \quad (1).$$

<2> The method of producing a ferritic heat-resistant steel welded joint according to <1>, in which the ferritic heat-resistant steel base material comprises, in % by mass:

C: 0.04% to 0.15%,
Si: 0.05% to 0.80%,
Mn: 0.10% to 1.00%,
P: 0% to 0.020%,
S: 0% to 0.010%,
Cr: 8.0% to 10.0%,
a total of at least one of Mo or W: 0.5% to 4.0%,
a total of at least one of Nb or Ta: 0.02% to 0.30%,
V: 0.05% to 0.40%,
B: 0.006% to 0.023%,
N: 0.002% to 0.025%,
Al: 0% to 0.030%, and
O: 0% to 0.020%, with a balance being Fe and impurities.

<3> The method of producing a ferritic heat-resistant steel welded joint according to <2>, in which the ferritic heat-resistant steel base material comprises, instead of a part of the Fe, in % by mass, at least one element selected from the following group:
Co: 4.0% or less,
Ni: 1.00% or less,
Cu: 1.0% or less,
Ti: 0.30% or less,
Ca: 0.050% or less,
Mg: 0.050% or less, or
REM: 0.100% or less.

<4> The method of producing a ferritic heat-resistant steel welded joint according to any one of <1> to <3>, in which the Ni-based welding material for heat-resistant alloy comprises, in % by mass:
C: 0.005% to 0.180%,
Si: 0.02% to 1.20%,
Mn: 0.02% to 4.00%,
P: 0% to 0.020%,
S: 0% to 0.010%,
Co: 0% to 15.0%,
Cu: 0% to 0.80%,
Cr: 16.0% to 25.0%,
Mo: 0% to 12.0%,
a total of at least one of Nb or Ta: 0% to 4.50%,
Ti: 0% to 1.00%,
Fe: 0% to 6.00%,
N: 0% to 0.050%,
Al: 0.002% to 1.800%, and
O: 0% to 0.020%, with a balance being Ni and impurities.

Advantageous Effects of Invention

According to the present disclosure, a method of producing a ferritic heat-resistant steel welded joint can be provided that is capable of stably suppressing solidification cracking even when multi-layer welding of a ferritic heat-resistant steel base material including a large amount of B is performed using a Ni-based welding material for heat-resistant alloy.

DESCRIPTION OF EMBODIMENTS

Hereinafter, a method of producing a ferritic heat-resistant steel welded joint according to embodiments of the present disclosure will be described in detail below.

In explanations in the present specification, the sign "%" indicating the content of each element means "% by mass".

In the present specification, any numerical range expressed using "to" refers to a range that includes the numerical values indicated before and after "to" as the minimum and maximum values, unless otherwise noted. Any element the content of which is described by "0% to X %" (X: a numerical value) is an optional element, and the element may be non-included (i.e., 0%) or may be included within the range of from more than 0% to X %.

[Method of Producing Ferritic Heat-resistant Steel Welded Joint]

The method of producing a ferritic heat-resistant steel welded joint according to the present disclosure includes a multi-layer welding step in which a ferritic heat-resistant steel base material including B at 0.006% to 0.023% is multi-layer welded using a Ni-based welding material for heat-resistant alloy.

The first layer welding is performed under a welding condition such that the ratio of an area $[S_{BM}]$ that has been melted of the ferritic heat-resistant steel base material to an area $[S_{WM}]$ of a weld metal, in a transverse cross-section of a weldment after root pass welding but before second pass welding in the multi-layer welding step satisfies the following formula (1), with respect to the mass percent of B, $[\% B_{BM}]$, which is included in the ferritic heat-resistant steel base material.

$$0.1 \leq [S_{BM}]/[S_{WM}] \leq -50 \times [\% B_{BM}] + 1.3 \tag{1}$$

The present inventors have conducted a detailed investigation to solve the above problem. As a result, the following findings have been obtained.

(1) Solidification cracking in a weld metal of a root pass weld metal tends to occur when a ferritic heat-resistant steel base material including B at 0.006% to 0.023% is welded using a Ni-based welding material for heat-resistant alloy. This is because B included in the base metal flows into the weld metal due to the melting of the base metal during welding.

(2) It has been revealed that, in order to suppress solidification cracking that occurs in the root pass weld metal, the melting amount of the base metal into the root pass weld metal needs to be controlled within a predetermined range, depending on the B content in the base material for ferritic heat-resistant steel. Specifically, it has been revealed that the ratio of the area $[S_{BM}]$ that has been melted of the ferritic heat-resistant steel base material to the area $[S_{WM}]$ of the weld metal (the first layer weld metal), in the transverse cross-section of the weldment after root pass welding but before second pass welding needs to be set at $\{-50 \times [\% B_{BM}] + 1.31\}$ or less, depending on the amount (% by mass) of B, $[\% B_{BM}]$, which is included in the ferritic heat-resistant steel base material.

Here, a reason for specifying the upper limit value of the ratio $[S_{BM}]/[S_{WM}]$ by the formula $\{-50 \times [\% B_{BM}] + 1.3\}$ will be explained. This relationship has been experimentally derived by finding that solidification cracking can be suppressed when the $[S_{BM}]/[S_{WM}]$ is smaller than $\{-50 \times [\% B_{BM}] + 1.31\}$, as a result of investigation of the relationship between the ratio $[S_{BM}]/[S_{WM}]$ and the occurrence of solidification cracking through performing experiments using various ferritic heat-resistant steel base materials with varied B contents [% $B_{BM}$].

(3) While suppressing melting of the ferritic heat-resistant steel base material is effective in stably suppressing solidification cracking, it has been revealed that another welding defect, i.e. lack of fusion or incomplete penetration tends to occur when melting of the base metal is extremely suppressed. It has also been revealed that, for suppressing the other welding defect, it is effective to control the root pass welding in such a way that the ratio of the area [$S_{BM}$] that has been melted of the ferritic heat-resistant steel base material to the area [$S_{WM}$] of the weld metal (the first layer weld metal), in the transverse cross-section of the weldment after root pass welding but before second pass welding, is 0.1 or more.

Based on the above findings, reasons for specifying the method of producing a ferritic heat-resistant steel welded joint in the present disclosure are as follows.

When the ferritic heat-resistant steel base material including B at 0.006% to 0.023% is multi-layer welded using the Ni-based welding material for heat-resistant alloy, the ratio [$S_{BM}$]/[$S_{WM}$] of the area [$S_{BM}$] that has been melted of the ferritic heat-resistant steel base material to the area [$S_{WM}$] of the weld metal (the first layer weld metal), in the transverse cross-section of the weldment after root pass welding but before second pass welding, is set at $\{-50\times[\% B_{BM}]+1.31\}$ or less, depending on the mass percent of B, [% $B_{BM}$], which is included in the ferritic heat-resistant steel base material.

It is conceivable that a decrease in solidification temperature can be suppressed when the ratio [$S_{BM}$]/[$S_{WM}$] is $\{-50\times[\% B_{BM}]+1.3\}$ or less because the amount of B that would be concentrated in a residual liquid phase of a final solidification part is reduced even in the case in which B flows from the base metal into the weld metal during root pass welding. The solidification cracking in the root pass weld metal is thereby suppressed.

When the ratio [$S_{BM}$]/[$S_{WM}$] exceeds $\{-50\times[\% B_{BM}]+1.31\}$, B excessively flows from the base metal into the weld metal during root pass welding. It is conceivable that B that has excessively flowed into the weld metal concentrates in the residual liquid phase of the final solidification part at the time of solidification of the weld metal and decreases the solidification temperature to cause solidification cracking.

A smaller ratio [$S_{BM}$]/[$S_{WM}$] is more preferable, in terms of suppressing solidification cracking of the weld metal. However, when the ratio [$S_{BM}$]/[$S_{WM}$] is lower than 0.1, lack of fusion or incomplete penetration tends to occur because the melting amount of the base metal decreases. Therefore, the ratio [$S_{BM}$]/[$S_{WM}$] is set at 0.1 or more. Furthermore, the ratio is preferably 0.2 or more.

From the above reasons, a preferred range of the ratio [$S_{BM}$]/[$S_{WM}$] is specified in the following formula (1).

$$0.1 \leq [S_{BM}]/[S_{WM}] \leq -50\times[\% B_{BM}]+1.3 \quad (1)$$

Method of Controlling the Ratio [$S_{BM}$]/[$S_{WM}$]

The ratio [$S_{BM}$]/[$S_{WM}$] can be set at a predetermined range by appropriately controlling the welding conditions during root pass welding, for example, the weld heat input, the feeding rate of the welding material, the groove shape, the gap, the welding method, the type of shielding gas, and the like.

Method of Measuring [$S_{BM}$] and [$S_{WM}$]

The [$S_{BM}$] and [$S_{WM}$] are obtained as follows.

Figure 1:
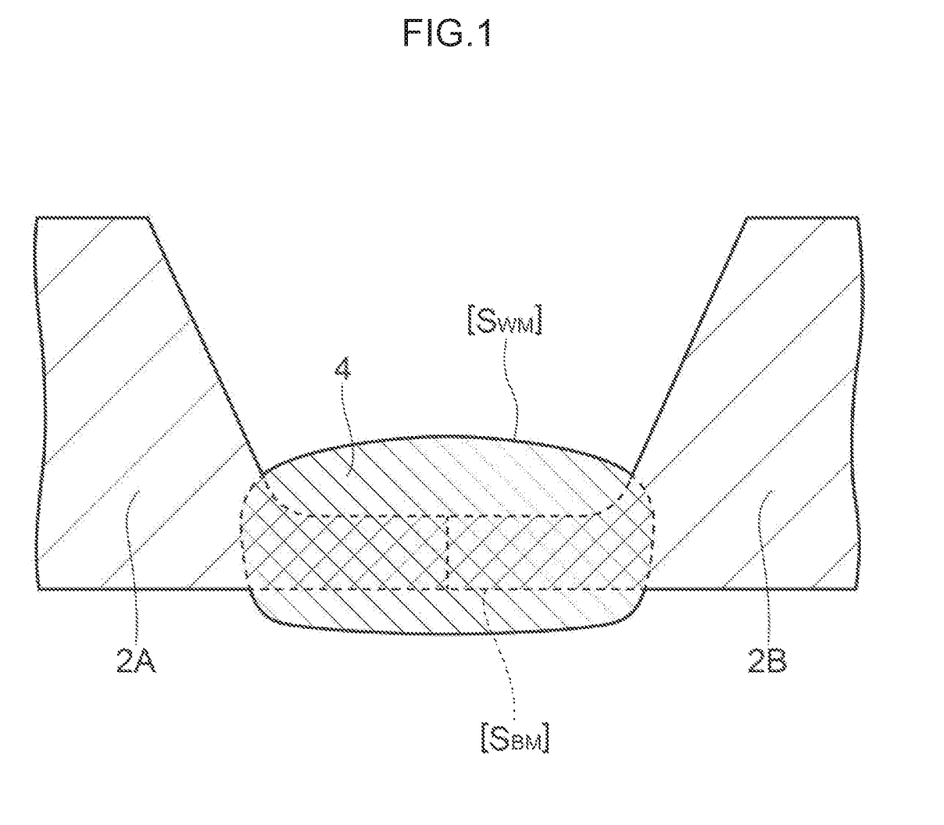
FIG. 1 is a schematic cross-sectional illustration of a transverse cross-section of a weldment after root pass welding but before second pass welding in a method of producing a ferritic heat-resistant steel welded joint according to the present disclosure.

A transverse cross-section of the weldment after root pass welding but before second pass welding is made to be exposed. For example, the exposed transverse cross-section can be the cross section as shown in FIG. 1. With respect to this transverse cross-section, the area [$S_{WM}$] of the weld metal (the root pass weld metal) 4 and the area [$S_{BM}$] that has been melted from the initial groove shape of the ferritic heat-resistant steel base material can be obtained by image analysis.

The transverse cross-section is a cross section in a direction orthogonal to the butting surface where the base metals 2A and 2B are butted together. The transverse cross-section is exposed by cutting a stable part in the weldment after root pass welding but before second pass welding, that is, a part in which a weld bead has been stably formed and which is other than an arc start part and a crater.

The area [$S_{WM}$] of the weld metal (the root pass weld metal) 4 refers to the area of the weld metal 4 (including a part that is considered to have been melted of the base metals 2A and 2B by root pass welding), in the transverse cross-section of the weldment after root pass welding but before second pass welding.

The area [$S_{BM}$] that has been melted of the ferritic heat-resistant steel base material refers to the area of a part of the base metals 2A and 2B before being subjected to root pass welding and that is considered to have been melted by root pass welding.

Image analysis of the transverse cross-section is performed specifically as follows.

From the image data of the above-described exposed transverse cross-section of the weldment, the weld metal 4 part, that is, a region corresponding to the area [$S_{WM}$], is colored in a distinct color so as to be distinguished from other regions. On the image data, a part of the base metals 2A and 2B, which has been melted during root pass welding, that is, a region corresponding to the area [$S_{BM}$], is also colored in another distinct color, based on the geometry information at the time of grooving, so as to be distinguished from other regions. Then, the areas of the distinctly colored regions are measured using a commercially available image analysis processing software.

Although the chemical composition of the base material for ferritic heat-resistant steel used in the present disclosure is not particularly limited as long as it is a steel composition in which the B content is 0.006% to 0.023%, the composition shown below is preferable. In the following explanation, the sign "%" indicating the content of each element means "% by mass".

B: 0.006% to 0.023%

B is effective in obtaining a martensite structure, and significantly contributes to the improvement of creep strength by finely dispersing carbides in prior austenite boundaries and martensite lath boundaries when used at high temperature and by suppressing the recovery of the structure. Further, B is an element that is also effective in suppressing a decrease in creep strength of a weld heat-affected zone. B is included at 0.006% or more to obtain the effect. However, when B is excessively included, it flows into a weld metal during welding, causing an increase in solidification crack susceptibility and a decrease in toughness. Therefore, the upper limit is set at 0.023%. A preferred lower limit of the B content is 0.007%, a preferred upper limit is 0.018%, a more preferred lower limit is 0.008%, and a more preferred upper limit is 0.015%.

C: 0.04% to 0.15%

C is effective in obtaining a martensite structure and contributes to ensuring creep strength by generating fine carbides when used at high temperature. C is included at 0.04% or more to sufficiently obtain the effect. However, the effect of improving creep strength saturates when C is included at more than 0.15%, thus the C content is set at 0.15% or less. A preferred lower limit of the C content is 0.05%, and a preferred upper limit is 0.13%. A more preferred lower limit is 0.07%, and a more preferred upper limit is 0.11%.

Si: 0.05% to 0.80%

Si is included as a deoxidizer, and is also an element that is effective in steam oxidation resistance. Si is included at 0.05% or more to obtain the effect. However, when Si is excessively included, it causes a decrease in creep ductility and a decrease in ductility. Therefore, the Si content is set at 0.80% or less. A preferred lower limit of the Si content is 0.10%, and a preferred upper limit is 0.60%. A more preferred lower limit is 0.20%, and a more preferred upper limit is 0.50%.

Mn: 0.10% to 1.00%

Mn is included as a deoxidizer as with Si, and is also an element that has the effect in obtaining a martensite structure. Mn is included at 0.10% or more to obtain the effect. However, when Mn is excessively included, it causes creep embrittlement. Therefore, the Mn content is set at 1.00% or less. A preferred lower limit of the Mn content is 0.20%, and a preferred upper limit is 0.80%. A more preferred lower limit is 0.30%, and a more preferred upper limit is 0.70%.

P: 0% to 0.020%

P is included as an impurity, and decreases creep ductility when P is excessively included. Therefore, the P content is set at 0.020% or less. The P content is preferably set at 0.018% or less, and more preferably set at 0.016% or less. A lower P content is more preferable, that is, the content may be 0%. However, an extreme reduction in the P content causes an extreme increase in material costs. Therefore, a preferred lower limit of the P content is 0.0005%, and a more preferred lower limit is 0.001%.

S: 0% to 0.010%

S is included as an impurity as with P, and decreases creep ductility when S is excessively included. Therefore, the S content is set at 0.010% or less. The S content is preferably set at 0.008% or less, and more preferably set at 0.005% or less. A lower S content is more preferable, that is, the content may be 0%. However, an extreme reduction in the S content causes an extreme increase in production costs. Therefore, a preferred lower limit of the S content is 0.0002%.

Cr: 8.0% to 10.0%

Cr is an element that is effective in ensuring steam oxidation resistance and corrosion resistance at high temperature. Cr also contributes to the improvement of creep strength by precipitating as carbides when used at high temperature. Cr is included at 8.0% or more to sufficiently obtain these effect. However, when Cr is excessively included, it causes a decrease in creep strength by decreasing stability of carbides. Therefore, the Cr content is set at 10.0% or less. A preferred lower limit of the Cr content is 8.3%, and a preferred upper limit is 9.8%. A more preferred lower limit is 8.5%, and a more preferred upper limit is 9.5%.

The total of at least one of Mo or W: 0.5% to 4.0%

Each of Mo and W is an element that contributes to ensuring creep strength at high temperature by dissolving in a matrix or precipitating as intermetallic compounds when used for a long period of time. At least one of Mo or W is included at 0.5% or more in total to obtain the effect. However, when they are included at more than 4.0% in total, the effect of improving creep strength saturates, and also material costs increase because these elements are extremely expensive. Therefore, the total content is set at 4.0% or less. A preferred lower limit is 0.8%, and a preferred upper limit is 3.8%. A more preferred lower limit is 1.0%, and a more preferred upper limit is 3.5%.

The total of at least one of Nb or Ta: 0.02% to 0.30%

Each of Nb and Ta contributes to the improvement of creep strength by precipitating in grains as fine carbonitrides when used at high temperature. At least one of Nb or Ta is included at 0.02% or more in total to obtain the effect. However, when the content becomes excessive, it causes a decrease in creep strength and a decrease in creep ductility by coarsely precipitating in large amounts. Therefore, the upper limit is set at 0.30% in total. A preferred lower limit of the total content is 0.04%, and a preferred upper limit is 0.25%. A more preferred lower limit is 0.06%, and a more preferred upper limit is 0.20%.

V: 0.05% to 0.40%

V as with Nb and Ta contributes to the improvement of creep strength by precipitating in grains as fine carbonitrides when used at high temperature. V is included at 0.05% or more to obtain the effect. However, when the content becomes excessive, it causes a decrease in creep strength and a decrease in creep ductility by coarsely precipitating in large amounts. Therefore, the upper limit of the V content is set at 0.40%. A preferred lower limit is 0.10%, and a preferred upper limit is 0.35%. A more preferred lower limit is 0.15%, and a more preferred upper limit is 0.25%.

N: 0.002% to 0.025%

N contributes to the improvement of creep strength by finely precipitating in grains as fine nitrides when used at high temperature. N is included at 0.002% or more to obtain the effect. However, when N is excessively included, it causes a decrease in creep ductility by causing coarsening of the nitrides. Therefore, the upper limit of the N content is set at 0.025%. A preferred lower limit is 0.004%, and a preferred upper limit is 0.020%. A more preferred lower limit is 0.006%, and a more preferred upper limit is 0.015%.

Al: 0% to 0.030%

Al is included as a deoxidizer. However, a large amount of Al severely impairs cleanliness and deteriorates workability, and it is also undesirable in terms of creep strength. Therefore, the Al content is set at 0.030% or less. The Al content is preferably 0.025% or less, and more preferably 0.020% or less. The lower limit is not particularly necessary to be set, that is, the content may be 0%. However, an extreme reduction in the Al content causes an increase in production costs. Therefore, the Al content may be more than 0%, and is preferably set at 0.001% or more. The term Al here refers to Sol. Al (soluble Al).

O: 0% to 0.020%

O exists as an impurity, and workability decreases when a large amount of O is included. Therefore, the O content is set at 0.020% or less. The O content is preferably 0.018% or less, and more preferably 0.015% or less. The lower limit is not particularly necessary to be set, that is, the content may be 0%. However, an extreme reduction in the O content causes an increase in production costs. Therefore, the O content may be more than 0%, and is preferably set at 0.001% or more.

Furthermore, the base material for ferritic heat-resistant steel used in the present disclosure may include, instead of a part of Fe included in the base metal, at least one element that belongs to at least one group of the first to third groups described below. Reasons for the limitation will be described below.

First group: Co: 4.0% or less, Ni: 1.00% or less, and Cu: 1.0% or less

Co: 4.0% or less (0% to 4.0%)

The Co content may be 0%, or Co may be included because Co is an element that is effective in obtaining a martensite structure and improving creep strength. However, creep strength and creep ductility decrease, rather than increasing, when Co is excessively added. Furthermore, it causes an increase in material costs because Co is an extremely expensive element. Therefore, the Co content is set at 4.0% or less. A preferred upper limit is 3.8%, and a more preferred upper limit is 3.5%. In the case in which Co is included, a preferred lower limit is 0.05%, and a more preferred lower limit is 0.1%.

Ni: 1.00% or less (0% to 1.00%)

The Ni content may be 0%, or Ni may be included as necessary because it is effective in obtaining a martensite structure, as with Co. However, in the range of the Co content described above, the effect saturates even when Ni is included at more than 1.00%. Furthermore, Ni is also an expensive element, thus the upper limit is set at 1.00%. The upper limit is preferably 0.80%, and more preferably 0.60% or less. In the case in which Ni is included, a preferred lower limit is 0.05%, and a more preferred lower limit is 0.10%.

Cu: 1.0% or less (0% to 1.0%)

The Cu content may be 0%, or Cu may be included as necessary because it is effective in generating a martensite structure, as with Co and Ni. However, creep ductility decreases when Cu is included at more than 1.0%. Therefore, the Cu content is set at 1.0% or less. The upper limit is preferably 0.8%, and more preferably 0.60% or less. In the case in which Cu is included, a preferred lower limit is 0.05%, and a more preferred lower limit is 0.1%.

Second group: Ti: 0.30% or less (0% to 0.30%)

The Ti content may be 0%, or Ti may be included as necessary because it contributes to the improvement of creep strength by precipitating in grains as fine carbonitrides when used at high temperature, as with Nb, V and Ta. However, when the content becomes excessive, it causes a decrease in creep strength and a decrease in creep ductility by coarsely precipitating in large amounts. Therefore, the upper limit is set at 0.30%. The Ti content is preferably 0.20% or less. In the case in which Ti is included, a preferred lower limit is 0.02%, and a more preferred lower limit is 0.04%.

Third group: Ca: 0.050% or less, Mg: 0.050% or less, and REM: 0.100% or less

Ca: 0.050% or less (0% to 0.050%)

The Ca content may be 0%, or Ca may be added as necessary because it has an effect in terms of improving hot workability during production. However, the Ca content is set at 0.050% or less because excessively added Ca severely decreases cleanliness by binding with oxygen, and rather deteriorates hot workability. The Ca content is preferably 0.030% or less, and more preferably 0.020% or less. In the case in which Ca is included, a preferred lower limit is 0.0005%, and a more preferred lower limit is 0.001%.

Mg: 0.050% or less (0% to 0.050%)

The Mg content may be 0%, or Mg may be added as necessary because it has an effect in terms of improving hot workability during production, as with Ca. However, the Mg content is set at 0.050% or less because excessively added Mg severely decreases cleanliness by binding with oxygen, and rather deteriorates hot workability. The Mg content is preferably 0.030% or less, and more preferably 0.020% or less. In the case in which Mg is included, a preferred lower limit is 0.0005%, and a more preferred lower limit is 0.001%.

REM: 0.100% or less (0% to 0.100%)

The REM content may be 0%, or REM may be added as necessary because it has an effect in terms of improving hot workability during production, as with Ca and Mg. However, the REM content is set at 0.100% or less because excessively added REM severely decreases cleanliness by binding with oxygen, and deteriorates hot workability instead. The REM content is preferably 0.080% or less, and more preferably 0.060% or less. In the case in which REM is included, a preferred lower limit is 0.010%, and a more preferred lower limit is 0.020%.

"REM" is a generic term of 17 elements in total of Sc, Y, and lanthanoids. The REM content refers to the total content of one or two or more elements of REM. REM is generally included in mischmetal. Therefore, for example, REM may be added in the form of mischmetal in such a way that the amount of REM falls within the above range.

Although the chemical composition of the Ni-based welding material for heat-resistant alloy used in the present disclosure is not particularly limited, the composition shown below is preferable. In the following explanation, the sign "%" indicating the content of each element means "% by mass".

C: 0.005% to 0.180%

C is an austenite generating element, and is an element that is effective in improving stability of an austenite structure of a weld metal used at high-temperature. C is included at 0.005% or more to obtain the effect. However, when excessively included, C decreases creep ductility or corrosion resistance at high temperature by precipitating as carbides in large amounts. Therefore, the C content is set at 0.180% or less. A preferred lower limit is 0.008%, and a preferred upper limit is 0.150%. A more preferred lower limit is 0.010%, and a more preferred upper limit is 0.120%.

Si: 0.02% to 1.20%

Si is added as a deoxidizer, and is also an element that is effective in steam oxidation resistance of a weld metal. Si is included at 0.02% or more to obtain the effect. However, when Si is excessively included, it increases solidification crack susceptibility of a weld metal. Therefore, the upper limit of the Si content is set at 1.20%. A preferred lower limit is 0.05%, and a preferred upper limit is 1.00%. A more preferred lower limit is 0.1%, and a more preferred upper limit is 0.80%.

Mn: 0.02% to 4.00%

Mn is added as a deoxidizer as with Si, and is also an element that is effective in improving stability of a structure of a weld metal at high temperature. Mn is included at 0.02% or more to obtain the effect. However, when Mn is excessively included, it causes embrittlement. Therefore, the Mn content is set at 4.00% or less. A preferred lower limit is 0.05%, and a preferred upper limit is 3.50%. A more preferred lower limit is 0.08%, and a more preferred upper limit is 3.00%.

P: 0% to 0.020%

P is included as an impurity, and causes a decrease in creep ductility as well as increasing solidification crack susceptibility at the time of solidification of a weld metal. Therefore, the P content is set at 0.020% or less. The P content is preferably set at 0.018% or less, and more preferably set at 0.016% or less. A lower P content is more preferable, that is, the content may be 0%. However, an extreme reduction in the P content causes an extreme increase in material costs. Therefore, a preferred lower limit of the P content is 0.0005%, and a more preferred lower limit is 0.001%.

S: 0% to 0.010%

S is included as an impurity as with P, and causes a decrease in creep ductility as well as increasing solidification crack susceptibility at the time of solidification of a weld metal. Therefore, the S content is set at 0.010% or less. The S content is preferably set at 0.008% or less, and more preferably set 0.005% or less. A lower S content is more preferable, that is, the content may be 0%. However, an extreme reduction in the S content causes an extreme increase in production costs. Therefore, a preferred lower limit of the S content is 0.0001%, and a more preferred lower limit is 0.0002%.

Co: 0% to 15.0%

Inclusion of Co in a welding material is not essential. However, Co may be included because it is an element that is effective in improving creep strength by stabilizing a structure of a weld metal at high temperature. However, creep strength and creep ductility decrease, rather than increase, when Co is excessively added. Furthermore, it causes an increase in material costs because Co is an extremely expensive element. Therefore, the upper limit is set at 15.0%. A preferred upper limit of the content is 14.5%, and a more preferred upper limit is 14.0%. The content may be 0%, or more than 0%. In the case in which Co is included, a preferred lower limit is 0.02%, and a more preferred lower limit is 0.05%.

Cu: 0% to 0.80%

Inclusion of Cu in a welding material is not essential. However, as with Co, Cu may be included because it is an element that is effective in improving creep strength by stabilizing a structure of a weld metal at high temperature. However, creep ductility decreases, rather than increases, when Cu is excessively added. Therefore, the upper limit is set at 0.80%. A preferred upper limit is 0.60%, and a more preferred upper limit is 0.50%. The content may be 0%, or more than 0%. In the case in which Cu is included, a preferred lower limit is 0.02%, and a more preferred lower limit is 0.05%.

Cr: 16.0% to 25.0%

Cr is an element that is effective in steam oxidation resistance and corrosion resistance of a weld metal at high temperature. Cr also contributes to the improvement of creep strength by precipitating as carbides when used at high temperature. Cr is included at 16.0% or more to obtain these effect. However, when Cr is excessively included, it causes a decrease in creep strength by decreasing structure stability at high temperature. Therefore, the Cr content is set at 25.0% or less. A preferred lower limit of the Cr content is 16.5%, and a preferred upper limit is 24.5%. A more preferred lower limit is 17.0%, and a more preferred upper limit is 24.0%.

Mo: 0% to 12.0%

Inclusion of Mo in a welding material is not essential. However, Mo may be included because it is an element that contributes to ensuring creep strength of a weld metal at high temperature by dissolving in a matrix. However, when excessively included, Mo decreases, rather, creep strength by decreasing structure stability at high temperature. Therefore, the Mo content is set at 12.0% or less. A preferred upper limit is 11.5%, and a more preferred upper limit is 11.0%. The content may be 0%, or more than 0%. In the case in which Mo is included, a preferred lower limit is 0.02%, and a more preferred lower limit is 0.05%.

A total of at least one of Nb or Ta: 0% to 4.50%

Nb and Ta may be included because they contributes to the improvement of creep strength of a weld metal by precipitating in grains as fine carbonitrides when used at high temperature. However, when their content becomes excessive, it rather causes a decrease in creep strength and a decrease in creep ductility by coarsely precipitating in large amounts. Therefore, the upper limit is set at 4.50%. A preferred upper limit is 4.20%, and a more preferred upper limit is 4.00%. The content may be 0%, or more than 0%. In the case in which at least one of Nb or Ta is included, a preferred lower limit is 0.02%, and a more preferred lower limit is 0.05%.

Ti: 0% to 1.00%

As with Nb and Ta, inclusion of Ti in a welding material is not essential. However, Ti may be included because it contributes to the improvement of creep strength of a weld metal by precipitating in grains as fine carbonitrides when used at high temperature. However, when the content becomes excessive, it adversely causes a decrease in creep strength and a decrease in creep ductility by coarsely precipitating in large amounts.

Therefore, the upper limit is set at 1.00%. A preferred upper limit is 0.90%, and a more preferred upper limit is 0.80%. The content may be 0%, or more than 0%. In the case in which Ti is included, a preferred lower limit is 0.02%, and a more preferred lower limit is 0.05%.

Fe: 0% to 6.00%

Inclusion of Fe in a welding material is not essential. However, Fe may be included because it has an effect of improving hot deformability during the production of a welding material. However, when Fe is excessively included, it increases the thermal expansion coefficient of the alloy and deteriorates steam oxidation resistance. The upper limit of the content is set at 6.00%. The Fe content is preferably 5.50% or less, and more preferably 5.00% or less. The content may be 0%, or more than 0%. In the case in which Fe is included, a preferred lower limit is 0.01%, and a more preferred lower limit is 0.02%.

N: 0% to 0.050%

N is an element that is effective in improving structure stability of a weld metal at high temperature. However, when N is excessively included, it causes precipitation of nitrides in large amounts when used at high temperature and decreases toughness and ductility. Therefore, the N content is set at 0.050% or less. The N content is preferably set at 0.030% or less, and more preferably set at 0.010% or less. The lower limit of the N content is not particularly set, that is, the content may be 0%, or more than 0%. A preferred lower limit is 0.0005%, and a more preferred lower limit is 0.001%.

Al: 0.002% to 1.800%

Al contributes to the improvement of creep strength of a weld metal by finely precipitating in grains as intermetallic compounds by binding with Ni. Al is included at 0.002% or more to obtain the effect. On the other hand, when Al is excessively included, it causes excessive precipitation of intermetallic compound phases and decreases toughness. Therefore, the Al content is set at 1.800% or less. A preferred lower limit of the Al content is 0.005%, and a preferred upper limit is 1.600%. A more preferred lower limit is 0.010%, and a more preferred upper limit is 1.500%.

O: 0% to 0.020%

O is included as an impurity. When a large amount of O is included, ductility of the weld metal decreases. Therefore, the upper limit is set at 0.020%. The O content is preferably set at 0.015% or less, and more preferably set at 0.010% or less. The O content is preferably reduced as much as possible, that is, the content may be 0%. However, an extreme reduction in the O content causes an increase in material costs. Therefore, the O content may be more than 0%, and a preferred lower limit is 0.0005%. A more preferred lower limit is 0.001%.

When performing the method of producing a ferritic heat-resistant steel welded joint according to the present disclosure, for example, the root pass welding is performed using the ferritic heat-resistant steel base material and the Ni-based welding material for heat-resistant alloy that have the above chemical compositions, while adjusting welding conditions such as the groove shape of the base metal, the gap, the welding method, the feeding rate of the welding material, the weld heat input, and the type of the shielding gas. Then, the area $[S_{BM}]$ that has been melted of the base metal and the area $[S_{WM}]$ of the weld metal, in a transverse cross-section of the weldment after root pass welding, are measured by image analysis, and the ratio $[S_{BM}]/[S_{WM}]$ is calculated, so as to find a welding condition that satisfies formula (1).

The root pass welding is performed under the welding condition that satisfies formula (1), and subsequently, multi-layer welding is performed by performing welding of a second pass and any subsequent passes.

Applications

A welded structure having a ferritic heat-resistant steel welded joint that is produced by the method of producing a ferritic heat-resistant steel welded joint according to the present disclosure is, for example, used in devices that are to be used at high temperature such as a boiler for power generation.

Examples of the welded structure that is to be used at high temperature include pipes for boilers in a coal-fired power generating plant, an oil-fired power generating plant, a waste incineration power generating plant, a biomass power generating plant, and the like, and cracking tubes in a petrochemical plant.

Here, the term "used at high temperature" in the present disclosure refers to embodiments, for example, in which materials are used in an environment of 350° C. or higher but 700° C. or lower (furthermore, 400° C. or higher but 650° C. or lower).

Examples

Hereinafter, the method of producing a ferritic heat-resistant steel welded joint according to the present disclosure will be explained in more detail by reference to Examples. However, the method of producing a ferritic heat-resistant steel welded joint according to the present disclosure is not limited to the Examples.

Each of materials A to H having chemical compositions shown in Table 1 was melted and casted in a laboratory to produce an ingot. The ingot was subjected to hot forging and hot rolling to be formed and subjected to heat treatment of quenching and tempering, followed by being processed into a plate material having a plate thickness of 12 mm, a width of 50 mm, and a length of 200 mm, thereby being prepared as a weld base metal.

TABLE 1

| No. | C | Si | Mn | P | S | Cr | Mo | W | Nb | Ta | V | B | N | Al | O | Others |
|-----|------|------|------|-------|-------|------|-----|-----|------|------|------|-------|-------|-------|-------|------------------|
| A | 0.09 | 0.29 | 0.45 | 0.016 | 0.002 | 9.0 | — | 3.4 | 0.05 | 0.05 | 0.19 | 0.010 | 0.008 | 0.008 | 0.008 | Co: 3.4, REM: 0.037 |
| B | 0.08 | 0.20 | 0.70 | 0.015 | 0.001 | 9.5 | 1.1 | — | 0.06 | — | 0.24 | 0.008 | 0.010 | 0.010 | 0.007 | Ni: 0.05, Ca: 0.001 |
| C | 0.10 | 0.33 | 0.51 | 0.017 | 0.002 | 8.8 | 0.5 | 1.7 | 0.08 | — | 0.16 | 0.006 | 0.009 | 0.010 | 0.007 | — |
| D | 0.11 | 0.49 | 0.59 | 0.018 | 0.005 | 8.6 | 0.1 | 2.8 | 0.06 | 0.07 | 0.18 | 0.018 | 0.009 | 0.008 | 0.008 | Co: 3.0, Ti: 0.04, Mg: 0.001 |
| E | 0.09 | 0.35 | 0.44 | 0.019 | 0.001 | 8.9 | 0.6 | 1.8 | 0.06 | 0.05 | 0.16 | 0.024 | 0.010 | 0.011 | 0.007 | — |
| F | 0.09 | 0.28 | 0.38 | 0.015 | 0.002 | 10.0 | 0.8 | — | 0.03 | — | 0.12 | 0.004 | 0.011 | 0.011 | 0.008 | — |
| G | 0.10 | 0.35 | 0.65 | 0.014 | 0.001 | 9.1 | — | 3.2 | 0.04 | — | 0.20 | 0.022 | 0.008 | 0.009 | 0.007 | — |
| H | 0.09 | 0.26 | 0.54 | 0.015 | 0.001 | 9.2 | — | 3.3 | 0.05 | 0.02 | 0.18 | 0.009 | 0.008 | 0.009 | 0.007 | Co: 3.1, Cu: 0.04 |

The balance: Fe and impurities

Figure 2:
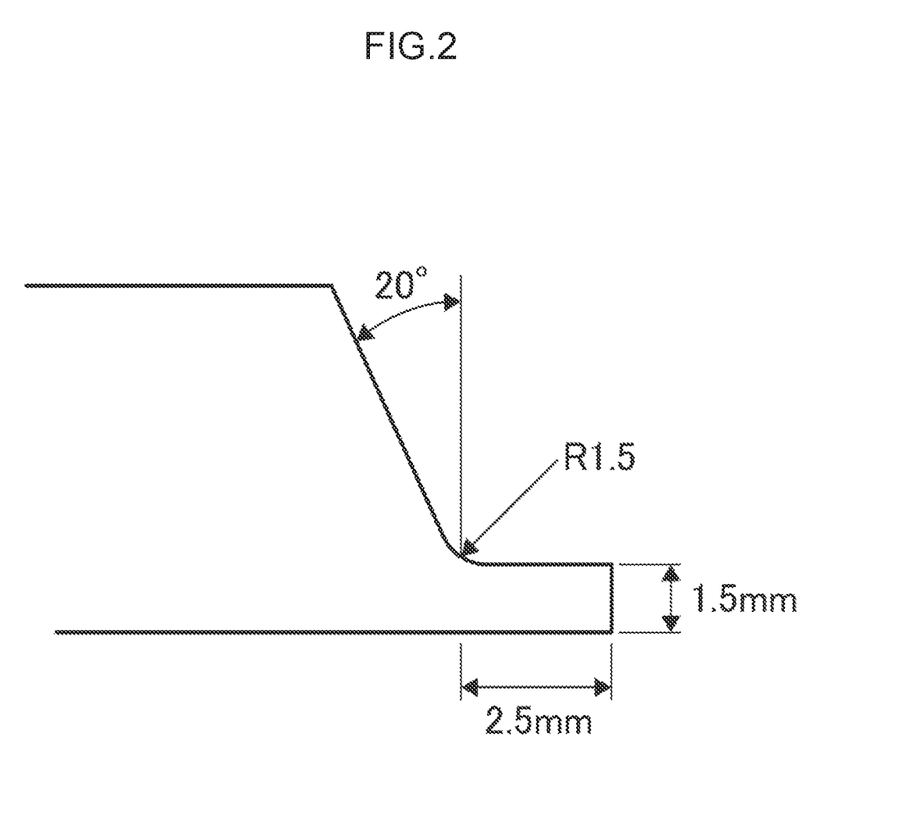
FIG. 2 is a schematic cross-sectional illustration of a shape of a plate material that has been subjected to grooving in Examples.

In a longitudinal direction of the above plate material for weld base material, a U groove shown in FIG. 2 was processed. Then, the plate materials were butted together and subjected to root pass welding by automatic gas tungsten arc welding using Ar as shielding gas and using the Ni-based welding materials for heat-resistant alloy of Nos. 1 to 3 having the external diameter of 1.2 mm and the chemical compositions shown in Table 2. When performing welding, the heat input was varied within the range of from 6 to 10 kJ/cm, and the feeding rate of the welding material was varied within the range of from 2.5 to 7.5 mm/s.

On a surface of the weld metal of the obtained welded joint, the presence or absence of cracks was confirmed by performing penetrant testing. Then, a transverse cross-section of the weldment was exposed by the above method. An area $[S_{BM}]$ that had been melted of the base metal and the area $[S_{WM}]$ of the weld metal, in the transverse cross-section of the weldment after the root pass welding, were measured by image analysis, the ratio $[S_{BM}]/[S_{WM}]$ was calculated, and its relationship with cracking of the root pass weld metal was evaluated. Furthermore, whether the back bead was formed or not was visually observed. A welded joint in which indication patterns of cracks were not observed in penetrant testing and in which the penetration bead was formed was defined to be "acceptable".

TABLE 2

| No. | C | Si | Mn | P | S | Co | Cu | Cr | Mo | Nb | Ta | Ti | Fe | N | Al | O |
|---|---|---|---|---|---|---|---|---|---|---|---|---|---|---|---|---|
| 1 | 0.03 | 0.15 | 2.97 | 0.005 | 0.004 | — | 0.03 | 20.2 | — | 2.31 | 0.08 | — | — | 0.004 | 0.009 | 0.005 |
| 2 | 0.02 | 0.05 | 0.10 | 0.004 | 0.001 | — | 0.02 | 22.0 | 8.7 | 3.45 | — | 0.30 | 0.54 | 0.005 | 0.20 | 0.006 |
| 3 | 0.08 | 0.18 | 0.08 | 0.003 | 0.005 | 12.2 | — | 21.8 | 9.0 | — | — | 0.45 | 0.20 | 0.004 | 1.12 | 0.004 |

The balance: Ni and impurities

Furthermore, with respect to some of the acceptable welded joint numbers, built-up welding was performed by automatic gas tungsten arc welding with a heat input of 12 kJ/cm and a feeding rate of a welding material of 5.5 mm/s.

From the obtained welded joint, a round bar creep test specimen having the weld metal at a center of the parallel part was prepared. Then, a creep rupture test was performed under the conditions of 650° C. and 127 MPa. A test specimen with a rupture time of more than 1000 hours was ranked as "acceptable". The results are shown in Table 3, Table 4, and Table 5. The sign "-" in the creep rupture test of the welded joint means that the creep rupture test was not performed.

TABLE 3

| Welded joint no. | Base metal | Welding material | Root pass welding conditions ||||| Penetrant testing and penetration bead observation | Creep rupture test of welded joint |
| | | | Heat input (kJ/cm) | Feeding rate of welding material (mm/s) | $[S_{BM}]/[S_{WM}]$ | $-50 \times [\% B_{BM}] + 1.3$ | | |
|---|---|---|---|---|---|---|---|---|
| A-1 | A | 1 | 8 | 2.5 | 0.82 | 0.80 | Unacceptable/Weld metal cracked | — |
| A-2 | A | 1 | 8 | 4.0 | 0.68 | 0.80 | Acceptable | — |
| A-3 | A | 1 | 8 | 5.5 | 0.55 | 0.80 | Acceptable | Acceptable |
| A-4 | A | 1 | 8 | 6.0 | 0.48 | 0.80 | Acceptable | — |
| A-5 | A | 1 | 8 | 7.5 | 0.38 | 0.80 | Acceptable | — |
| A-6 | A | 1 | 6 | 2.5 | 0.75 | 0.80 | Acceptable | — |
| A-7 | A | 1 | 6 | 4.0 | 0.54 | 0.80 | Acceptable | — |
| A-8 | A | 1 | 6 | 5.5 | 0.35 | 0.80 | Acceptable | — |
| A-9 | A | 1 | 6 | 6.0 | 0.13 | 0.80 | Acceptable | — |
| A-10 | A | 1 | 6 | 7.5 | 0.09 | 0.80 | Unacceptable/ Penetration bead was not formed | — |

TABLE 3-continued

| Welded joint no. | Base metal | Welding material | Root pass welding conditions | | $[S_{BM}]/[S_{WM}]$ | $-50 \times [\% B_{BM}] +1.3$ | Penetrant testing and penetration bead observation | Creep rupture test of welded joint |
|---|---|---|---|---|---|---|---|---|
| | | | Heat input (kJ/cm) | Feeding rate of welding material (mm/s) | | | | |
| A-11 | A | 1 | 10 | 2.5 | 0.94 | 0.80 | Unacceptable/Weld metal cracked | — |
| A-12 | A | 1 | 10 | 4.0 | 0.78 | 0.80 | Acceptable | — |
| A-13 | A | 1 | 10 | 5.5 | 0.67 | 0.80 | Acceptable | — |
| A-14 | A | 1 | 10 | 6.0 | 0.56 | 0.80 | Acceptable | — |
| A-15 | A | 1 | 10 | 7.5 | 0.45 | 0.80 | Acceptable | — |
| A-16 | A | 2 | 8 | 2.5 | 0.81 | 0.80 | Unacceptable/Weld metal cracked | — |
| A-17 | A | 2 | 8 | 4.0 | 0.65 | 0.80 | Acceptable | — |
| A-18 | A | 2 | 8 | 5.5 | 0.54 | 0.80 | Acceptable | Acceptable |
| A-19 | A | 2 | 8 | 6.0 | 0.50 | 0.80 | Acceptable | — |
| A-20 | A | 2 | 8 | 7.5 | 0.41 | 0.80 | Acceptable | — |
| A-21 | A | 3 | 8 | 2.5 | 0.82 | 0.80 | Unacceptable/Weld metal cracked | — |
| A-22 | A | 3 | 8 | 4.0 | 0.60 | 0.80 | Acceptable | — |
| A-23 | A | 3 | 8 | 5.5 | 0.55 | 0.80 | Acceptable | Acceptable |
| A-24 | A | 3 | 8 | 6.0 | 0.47 | 0.80 | Acceptable | — |
| A-25 | A | 3 | 8 | 7.5 | 0.37 | 0.80 | Acceptable | — |
| B-1 | B | 1 | 8 | 2.5 | 0.83 | 0.90 | Acceptable | — |
| B-2 | B | 1 | 8 | 4.0 | 0.65 | 0.90 | Acceptable | — |
| B-3 | B | 1 | 8 | 5.5 | 0.56 | 0.90 | Acceptable | — |
| B-4 | B | 1 | 8 | 6.0 | 0.50 | 0.90 | Acceptable | — |
| B-5 | B | 1 | 8 | 7.5 | 0.38 | 0.90 | Acceptable | — |

TABLE 4

| Welded joint no. | Base metal | Welding material | Root pass welding conditions | | $[S_{BM}]/[S_{WM}]$ | $-50 \times [\% B_{BM}] +1.3$ | Penetrant testing and penetration bead observation | Creep rupture test of welded joint |
|---|---|---|---|---|---|---|---|---|
| | | | Heat input (kJ/cm) | Feeding rate of welding material (mm/s) | | | | |
| C-1 | C | 1 | 8 | 2.5 | 0.83 | 1.00 | Acceptable | — |
| C-2 | C | 1 | 8 | 4.0 | 0.62 | 1.00 | Acceptable | — |
| C-3 | C | 1 | 8 | 5.5 | 0.56 | 1.00 | Acceptable | Acceptable |
| C-4 | C | 1 | 8 | 6.0 | 0.50 | 1.00 | Acceptable | — |
| C-5 | C | 1 | 8 | 7.5 | 0.38 | 1.00 | Acceptable | — |
| D-1 | D | 1 | 8 | 2.5 | 0.80 | 0.40 | Unacceptable/Weld metal cracked | — |
| D-2 | D | 1 | 8 | 4.0 | 0.71 | 0.40 | Unacceptable/Weld metal cracked | — |
| D-3 | D | 1 | 8 | 5.5 | 0.55 | 0.40 | Unacceptable/Weld metal cracked | — |
| D-4 | D | 1 | 8 | 6.0 | 0.52 | 0.40 | Unacceptable/Weld metal cracked | — |
| D-5 | D | 1 | 8 | 7.5 | 0.40 | 0.40 | Acceptable | — |
| D-6 | D | 1 | 6 | 2.5 | 0.72 | 0.40 | Unacceptable/Weld metal cracked | — |
| D-7 | D | 1 | 6 | 4.0 | 0.51 | 0.40 | Unacceptable/Weld metal cracked | — |
| D-8 | D | 1 | 6 | 5.5 | 0.34 | 0.40 | Acceptable | Acceptable |
| D-9 | D | 1 | 6 | 6.0 | 0.10 | 0.40 | Acceptable | — |
| D-10 | D | 1 | 6 | 7.5 | 0.07 | 0.40 | Unacceptable/Penetration bead was not formed | — |
| D-11 | D | 1 | 10 | 2.5 | 0.90 | 0.40 | Unacceptable/Weld metal cracked | — |
| D-12 | D | 1 | 10 | 4.0 | 0.76 | 0.40 | Unacceptable/Weld metal cracked | — |
| D-13 | D | 1 | 10 | 5.5 | 0.64 | 0.40 | Unacceptable/Weld metal cracked | — |
| D-14 | D | 1 | 10 | 6.0 | 0.56 | 0.40 | Unacceptable/Weld metal cracked | — |
| D-15 | D | 1 | 10 | 7.5 | 0.47 | 0.40 | Unacceptable/Weld metal cracked | — |

TABLE 5

| Welded joint no. | Base metal | Welding material | Root pass welding conditions | | | | Penetrant testing and penetration bead observation | Creep rupture test of welded joint |
|---|---|---|---|---|---|---|---|---|
| | | | Heat input (kJ/cm) | Feeding rate of welding material (mm/s) | $[S_{BM}]/[S_{WM}]$ | $-50 \times [\% B_{BM}] + 1.3$ | | |
| E-1 | E | 1 | 8 | 2.5 | 0.78 | 0.10 | Unacceptable/Weld metal cracked | — |
| E-2 | E | 1 | 8 | 4.0 | 0.70 | 0.10 | Unacceptable/Weld metal cracked | — |
| E-3 | E | 1 | 8 | 5.5 | 0.58 | 0.10 | Unacceptable/Weld metal cracked | — |
| E-4 | E | 1 | 8 | 6.0 | 0.51 | 0.10 | Unacceptable/Weld metal cracked | — |
| E-5 | E | 1 | 8 | 7.5 | 0.34 | 0.10 | Unacceptable/Weld metal cracked | — |
| E-6 | E | 1 | 6 | 2.5 | 0.73 | 0.10 | Unacceptable/Weld metal cracked | — |
| E-7 | E | 1 | 6 | 4.0 | 0.52 | 0.10 | Unacceptable/Weld metal cracked | — |
| E-8 | E | 1 | 6 | 5.5 | 0.33 | 0.10 | Unacceptable/Weld metal cracked | — |
| E-9 | E | 1 | 6 | 6.0 | 0.11 | 0.10 | Unacceptable/Weld metal cracked | — |
| E-10 | E | 1 | 6 | 7.5 | 0.09 | 0.10 | Unacceptable/ Penetration bead was not formed | — |
| F-1 | F | 1 | 8 | 2.5 | 0.82 | 1.10 | Acceptable | Unacceptable |
| F-2 | F | 1 | 8 | 4.0 | 0.69 | 1.10 | Acceptable | Unacceptable |
| F-3 | F | 1 | 8 | 5.5 | 0.55 | 1.10 | Acceptable | Unacceptable |
| F-4 | F | 1 | 8 | 6.0 | 0.54 | 1.10 | Acceptable | Unacceptable |
| F-5 | F | 1 | 8 | 7.5 | 0.36 | 1.10 | Acceptable | Unacceptable |
| G-1 | G | 1 | 6 | 2.5 | 0.70 | 0.20 | Unacceptable/Weld metal cracked | — |
| G-2 | G | 1 | 6 | 4.0 | 0.51 | 0.20 | Unacceptable/Weld metal cracked | — |
| G-3 | G | 1 | 6 | 5.5 | 0.34 | 0.20 | Unacceptable/Weld metal cracked | — |
| G-4 | G | 1 | 6 | 6.0 | 0.11 | 0.20 | Acceptable | Acceptable |
| G-5 | G | 1 | 6 | 7.5 | 0.08 | 0.20 | Unacceptable/ Penetration bead was not formed | — |
| H-1 | H | 1 | 8 | 2.5 | 0.80 | 0.85 | Acceptable | Acceptable |
| H-2 | H | 1 | 8 | 4.0 | 0.67 | 0.85 | Acceptable | Acceptable |
| H-3 | H | 1 | 8 | 5.5 | 0.53 | 0.85 | Acceptable | Acceptable |
| H-4 | H | 1 | 8 | 6.0 | 0.50 | 0.85 | Acceptable | Acceptable |
| H-5 | H | 1 | 8 | 7.5 | 0.38 | 0.85 | Acceptable | Acceptable |

The results of the above tests are shown in Table 3, Table 4, and Table 5.

From Table 3, Table 4, and Table 5, it is revealed that the welded joint numbers that satisfy the conditions specified in the present disclosure do not cause cracking of the weld metal or the non-formation of the back bead during root pass welding, and that the high creep strength of the welded joints can be obtained.

On the other hand, the welded joint numbers A-1, A-11, A-16, A-21, D-1 to D-4, D-6 to D-7, D-11 to D-15, and G-1 to G-3 caused cracking of the weld metal because each of these welded joint numbers exceeds the upper limit that is determined by the relational expression (formula (1)) of the ratio of the area $[S_{BM}]$ that has been melted of the base metal to the area $[S_{WM}]$ of the weld metal. A-10, D-10, and G-5 caused the non-formation of the back bead because the ratio of the area $[S_{BM}]$ of the base metal that has been melted to the area $[S_{WM}]$ of the weld metal was less than 0.1.

Furthermore, the welded joint numbers E-1 to E-10 could not achieve forming of the back bead and suppressing of the cracking of the weld metal at the same time because the B content of the base metal exceeds the range specified in the present disclosure.

The welded joint numbers F-1 to F-5 could not achieve a high creep strength of the welded joint although they could stably suppress cracking of the weld metal, because the B content of the base metal was less than the range specified in the present disclosure.

Consequently, it is revealed that excellent welded joints can be obtained only in cases in which the requirements specified in the present disclosure are satisfied.

INDUSTRIAL APPLICABILITY

According to the present disclosure, a production method can be provided that stably suppresses solidification cracking when multi-layer welding of a ferritic heat-resistant steel base material including a large amount of B is performed using a Ni-based welding material for heat-resistant alloy.

REFERENCE SIGNS LIST 2A, 2B Base metal
4 Weld metal (root pass weld metal)

The invention claimed is:
1. A method of producing a ferritic heat-resistant steel welded joint, the method comprising:
a multi-layer welding step in which a ferritic heat-resistant steel base material comprising B at 0.006% by mass to 0.023% by mass is multi-layer welded using a Ni-based weld material for a heat-resistant alloy, wherein root pass welding is performed under a welding condition such that a ratio of an area $[S_{BM}]$ that has been melted of the ferritic heat-resistant steel base material to an area $[S_{WM}]$ of a weld metal, in a transverse cross-section of a weldment after the root pass welding but before second pass welding in the multi-layer welding step, satisfies the following formula (1), with respect to a mass percent of B, $[\%_{BB}M]$, which is included in the ferritic heat-resistant steel base material:

$$0.1 \le [S_{BM}]/[S_{WM}] \le -50 \times [\%\, B_{BM}] + 1.3 \qquad (1)$$

2. The method of producing a ferritic heat-resistant steel welded joint according to claim 1, wherein the ferritic heat-resistant steel base material comprises, in % by mass:
C: 0.04% to 0.15%,
Si: 0.05% to 0.80%,
Mn: 0.10% to 1.00%,
P: 0% to 0.020%,
S: 0% to 0.010%,
Cr: 8.0% to 10.0%,
a total of at least one of Mo or W: 0.5% to 4.0%,
a total of at least one of Nb or Ta: 0.02% to 0.30%,
V: 0.05% to 0.40%,
B: 0.006% to 0.023%,
N: 0.002% to 0.025%,
Al: 0% to 0.030%, and
O: 0% to 0.020%, with a balance being Fe and impurities.

3. The method of producing a ferritic heat-resistant steel welded joint according to claim 2, wherein the ferritic heat-resistant steel base material comprises, instead of a part of the Fe, in % by mass, at least one element selected from the following group:
Co: 4.0% or less,
Ni: 1.00% or less,
Cu: 1.0% or less,
Ti: 0.30% or less,
Ca: 0.050% or less,
Mg: 0.050% or less, or
REM: 0.100% or less.

4. The method of producing a ferritic heat-resistant steel welded joint according to claim 1, wherein the Ni-based welding material for heat-resistant alloy comprises, in % by mass:
C: 0.005% to 0.180%,
Si: 0.02% to 1.20%,
Mn: 0.02% to 4.00%,
P: 0% to 0.020%,
S: 0% to 0.010%,
Co: 0% to 15.0%,
Cu: 0% to 0.80%,
Cr: 16.0% to 25.0%,
Mo: 0% to 12.0%,
a total of at least one of Nb or Ta: 0% to 4.50%,
Ti: 0% to 1.00%,
Fe: 0% to 6.00%,
N: 0% to 0.050%,
Al: 0.002% to 1.800%, and
O: 0% to 0.020%, with a balance being Ni and impurities.

5. The method of producing a ferritic heat-resistant steel welded joint according to claim 2 wherein the Ni-based welding material for heat-resistant alloy comprises, in % by mass:
C: 0.005% to 0.180%,
Si: 0.02% to 1.20%,
Mn: 0.02% to 4.00%,
P: 0% to 0.020%,
S: 0% to 0.010%,
Co: 0% to 15.0%,
Cu: 0% to 0.80%,
Cr: 16.0% to 25.0%,
Mo: 0% to 12.0%,
a total of at least one of Nb or Ta: 0% to 4.50%,
Ti: 0% to 1.00%,
Fe: 0% to 6.00%,
N: 0% to 0.050%,
Al: 0.002% to 1.800%, and
O: 0% to 0.020%, with a balance being Ni and impurities.

6. The method of producing a ferritic heat-resistant steel welded joint according to claim 3 wherein the Ni-based welding material for heat-resistant alloy comprises, in % by mass:
C: 0.005% to 0.180%,
Si: 0.02% to 1.20%,
Mn: 0.02% to 4.00%,
P: 0% to 0.020%,
S: 0% to 0.010%,
Co: 0% to 15.0%,
Cu: 0% to 0.80%,
Cr: 16.0% to 25.0%,
Mo: 0% to 12.0%,
a total of at least one of Nb or Ta: 0% to 4.50%,
Ti: 0% to 1.00%,
Fe: 0% to 6.00%,
N: 0% to 0.050%,
Al: 0.002% to 1.800%, and
O: 0% to 0.020%, with a balance being Ni and impurities.

* * * * *